United States Patent [19]

Chandrasekaran et al.

[11] Patent Number: 4,957,961
[45] Date of Patent: Sep. 18, 1990

[54] MODIFIED FLUOROPOLYMERS FOR LOW FLAME/LOW SMOKE PLENUM CABLES

[75] Inventors: Swayambu Chandrasekaran, Mountain Lakes; Nikhil K. Kundel, Piscataway; Brij Garg, Succasunna; Hong B. Chin, Parsippany, all of N.J.

[73] Assignee: Ausimont, U.S.A., Inc., Morristown, N.J.

[21] Appl. No.: 332,398

[22] Filed: Mar. 30, 1989

[51] Int. Cl.$^5$ .................... C08K 3/22; C08L 27/12
[52] U.S. Cl. .................... 524/405; 428/382; 428/421; 524/399; 524/404; 524/407; 524/413; 524/417; 524/421; 524/423; 524/437; 524/544; 524/545; 524/546
[58] Field of Search ............... 524/404, 405, 423, 544, 524/545, 546, 407, 417, 413, 399, 437, 421; 428/421

[56] References Cited

U.S. PATENT DOCUMENTS

| | | | |
|---|---|---|---|
| 3,582,518 | 6/1971 | Lyons | 524/405 |
| 3,886,103 | 5/1975 | Kolzumi et al. | 524/320 |
| 3,900,441 | 8/1975 | King . | |
| 3,928,210 | 12/1975 | Peterson | 524/405 |
| 3,933,742 | 1/1976 | Dickens | 524/382 |
| 3,945,974 | 3/1976 | Schwarz et al. | 524/432 |
| 3,963,672 | 6/1976 | Brasure | 524/545 |
| 3,965,068 | 6/1976 | Dickens | 524/407 |
| 3,983,290 | 9/1976 | Elcik | 524/405 |
| 3,985,706 | 10/1976 | Kay . | |
| 4,101,498 | 7/1978 | Synder | 524/405 |
| 4,111,885 | 9/1978 | Abu-Isa | 524/405 |
| 4,191,675 | 3/1980 | Inagaki et al. | 524/405 |
| 4,273,829 | 6/1981 | Perreault | 428/383 |
| 4,439,572 | 3/1984 | Kindrick | 524/405 |
| 4,514,466 | 4/1985 | Leon | 428/383 |
| 4,546,144 | 10/1985 | Knight | 524/432 |
| 4,639,486 | 1/1987 | Liu | 524/411 |
| 4,722,858 | 2/1988 | Harbourne et al. | 524/405 |
| 4,791,160 | 12/1988 | Kato et al. | 524/437 |
| 4,804,702 | 2/1989 | Bartoszek | 524/545 |

FOREIGN PATENT DOCUMENTS 2534264 4/1984 France .
903090 8/1962 United Kingdom ............... 524/546

OTHER PUBLICATIONS

Derwent Ab. 84-142882/23 (J59074138), Sumitomo Elec KK 4-1984.
K. K. Shen, "Zinc Borate", Plastics Compounding, Sep./Oct. 1985, pp. 66-80.

Primary Examiner—Herbert J. Lilling
Attorney, Agent, or Firm—Elliot M. Olstein; John G. Gilfillan; Raymond J. Lillie

[57] ABSTRACT

An improved fluoropolymer composition for insulating wires or jacketing cables comprising a blend of fluoropolymer and an additive selected from the class consisting of zinc borate, $ZnCO_3$, $ZnCrO_4$, $ZnMoO_4$, $Zn_3(PO_4)_2$, $ZnSiO_4$, $ZnSO_4$, $ZnTiO_3$, $ZnZrO_4$, zinc ammonium sulfate, zinc acetyl acetonate, zinc formate, zinc oxalate, $BiBO_3$, alumina trihydrate, mixtures of molybdenum and tin oxides, molybdenum trioxide, antimony trioxide, and pyrogenic silica. A preferred additive is zinc borate. This composition provides for wire insulation and cable jackets which have improved flame and smoke resistance with federal safety and Underwriters Laboratories standards.

24 Claims, No Drawings

MODIFIED FLUOROPOLYMERS FOR LOW FLAME/LOW SMOKE PLENUM CABLES

This application relates to fluoropolymer compositions which are used for wire insulation and cable jacketing for communication cables that are run through air plenums. The National Electrical Code presently requires that such cables be either placed within a metal conduit or be insulated with materials that result in low flame and low smoke emission. One such wire insulation and wire jacketing material which has been approved by Underwriters Laboratories for wire insulation and cable jacketing in air plenums without the use of a metal conduit is an ethylene/chlorotrifluoroethylene copolymer sold under the trade name HALAR$^R$ by Ausimont, U.S.A., Inc. This invention relates to improved materials that can be used as wire insulation and cable jacketing for communication cables which are run through air plenums without the use of a metal conduit and which conform to Underwriters Laboratories and National Electrical Code standards.

Applicants have discovered that a composition comprising a blend of a fluorinated polymer and a compound selected from the class consisting of zinc borate, $ZnCO_3$, $ZnCrO_4$, $ZnMoO_4$, $Zn_3(PO_4)_2$, $ZnSiO_4$, $ZnSO_4$, $ZnTiO_3$, $ZnZrO_4$, zinc ammonium sulfate, zinc acetyl acetonate, zinc formate, zinc oxalate, $BiBO_3$, alumina trihydrate, mixtures of molybdenum and tin oxides, molybdenum trioxide, antimony trioxide, and pyrogenic silica, is useful as a wire insulation and cable jacketing material, which has improved flame and smoke requirements. Preferred fluoropolymers are chlorotrifluoroethylene/ethylene/vinylidene fluoride terpolymer, chlorotrifluoroethylene/ethylene copolymer, and ethylene/tetrafluoroethylene/hexafluoroisobutylene terpolymer. A preferred additive compound is zinc borate, which may be hydrated or anhydrous. The fluoropolymer is present preferably in an amount from about 90 wt. % to about 99.8 wt. % of the composition, and the additive compound is present preferably in an amount from about 0.2 wt. % to about 10 wt. % of the composition. The materials described in this application have a flexural modulus as low as about 84,000 psi as compared to 240,000 psi for HALAR$^R$.

It has been known in the art to use zinc borate as a smoke suppressant for polymers such as polyvinyl chloride, unsaturated polyesters, epoxies, polyolefins, nylons, thermoplastic polyesters, polyphenylene oxide, urethanes, phenolics, and other plastics. The use of zinc borate as a flame retardant and smoke suppressant are disclosed in article by K. K. Shen, entitled "Zinc Borate", *Plastics Compounding*, Vol. 8, No. 5, Sept.-Oct. 1985. U.S. Pat. No. 3,985,706 discloses the use of a combination of zinc boarate and aluminum oxide trihydrate as a smoke retardant for chlorinated polyethylene and vinyl chloride polymers. U.S. Pat. No. 3,965,068 discloses the use of zinc and nickel compounds which are used as smoke retardants in vinyl chloride and vinylidene chloride polymer compositions. U.S. Pat. No. 3,900; 441 discloses the use of mixtures of zinc and molybedenum compounds in polyvinyl chloride homopolymers and copolymers. It has also been known in the art to use bismuth compounds as smoke suppressants in polyvinyl chloride.

The chlorotrifluoroethylene/ethylene/vinylidene fluoride terpolymer may be made by any method known in the art. The mole % composition of chlorotrifluoroethylene can be from about 45 mole % to about 55 mole %, preferably from about 48 mole % to 53 mole % of the terpolymer; ethylene may be present in amounts from about 15 mole % to about 45 mole %, preferably from about 30 mole % to about 40 mole % of the terpolymer, and vinylidene flouride may be present in amounts from about 8 mole % to about 30 mole %, preferably from about 10 mole % to about 15 mole % of the terpolymer. The terpolymer may be admixed with zinc borate by melt blending. The zinc borate composition may be any standard hydrated or anhydrous zinc borate composition known in the art. A preferred embodiment of hydrated zinc borate for purposes of the specific examples of this application is Firebrake ZB ™, a product of U.S. Borax. Firebrake ZB is of the formula $2Zn\ 0.3B_2O_3.3.5H_2O$. A preferred embodiment of anhydrous zinc borate is XPI-187, a product of U.S. Borax. Anhydrous zinc borate is of the formula $2Zn0.3B_2O_3$. The zinc borate preferably makes up from about 1 wt. % to about 10 wt. % of the total terpolymer-containing composition, more preferably from about 2 wt. % to about 4 wt. % of the total composition, most preferably about 3 wt. % of the total composition while the terpolymer makes up from about 90 wt. % to about 99 wt. % of the total composition, preferably from about 96 wt. % to about 98 wt. % of the total composition, most preferably about 97 wt. % of the total composition.

The chlorotrifluoroethylene/ethylene copolymers of this application may have a molecular weight from about 50,000 to about 1,000,000, preferably from about 60,000 to about 600,000. The chlorotrifluoroethylene is present from about 40 mole % to about 60 mole % of the copolymer, preferably from about 48 mole % to about 52 mole % of the copolymer. The ethylene is present from about 40 mole % to about 60 mole % of the copolymer, preferably from about 48 mole % to about 52% of the copolymer. Most preferably, the copolymer contains about 50 mole % chlorotrifluoroethylene and about 50 mole % ethylene. A preferred embodiment of chlorotrifluoroethylene/ethylene copolymer is HALAR$^R$, a product of Ausimont, U.S.A., Inc.

The zinc borate additive is added to the chlorotrifluoroethylene/ethylene copolymer by melt blending in amounts preferably from about 0.2 wt. % to about 5 wt. % of the weight of the composition, more preferably from about 0.5 wt. % to about 2.0 wt. % of the weight of the composition. A preferred embodiment of hydrated zinc borate is Firebrake ZB ™, a product of U.S. Borax. Anhydrous zinc borate may also be used. After the melt blend of zinc borate and chlorotrifluoroethylene/ethylene copolymer is made, plaques of the zinc borate and chlorotrifluoroethylene/ethylene copolymer composition are formed. Iron wire gauge is then sandwiched between plaques and strips using the sandwiched plaques are made. The strips are used for determining the flame and smoke characteristics. These strips are tested against strips containing chlorotrifluoroethylene/ethylene copolymer without the zinc borate additive. Two types of tests may be used in testing the strips. One test is the Monsanto$^{(R)}$ two foot tunnel test and the other is the UL$^{(R)}$ 910 Steiner tunnel test.

The ethylene/tetrafluoroethylene/hexafluoroisobutylene terpolymers of this application may be made by any method known in the art. The ethylene/tetrafluoroethylene/hexafluoroisobutylene terpolymers may have a molecular weight from about 100,000 to about 1,000,000, preferably from about 300,000 to about 800,000. The ethylene is present from about 35 mole % to about 45 mole % of the terpolymer, preferably at about 45 mole %. The tetrafluoroethylene is present from about 40 mole % to about 60 mole % of the terpolymer, preferably at about 50 mole %. The hexafluoroisobutylene is present from about 5 mole % to about 15 mole % of the terpolymer, preferably at about 5 mole %.

The zinc borate additive is added to the ethylene/tetrafluoroethylene/hexafluoroisobutylene terpolymer by melt blending in an amount preferably at about 2 wt. % of the weight of the composition. A preferred embodiment of ethylene/tetrafluoroethylene/hexafluoroisobutylene terpolymer is HALON ET-102, a product of Ausimont, U.S.A., Inc., while a preferred embodiment of zinc borate is an anhydrous zinc borate sold by U.S. Borax under the name XPI-187.

Testing of the polymers and of the polymers with added zinc borate was done using either a Monsanto two foot tunnel or a UL-910 Steiner tunnel.

The Monsanto$^R$ two foot tunnel is basically a preliminary laboratory screening test tunnel for flame and smoke properties. The tunnel is an enclosure which supports a $3\frac{7}{8}$ inches $\times 23\frac{7}{8}$ inches test specimen in a support frame which forms the ceiling of the tunnel. The support frame is at a 28° angle from the horizontal and its low end is 7 to 38 inches above the base plate. Two thermocouples are located at each end of the tunnel for monitoring purposes. The apparatus is furnished with two temperature indicators for T/C monitoring, an automatic burner ignitor, gas flow meter, and a photoelectric cell.

The sample is ignited at the low end of the tunnel and the advance of the flame front is observed through a calibrated observation window located on the side panel of the enclosure below the sample frame, and extending the full tunnel length.

The smoke density measuring system consists of a milliampere recorder and optical instrumentation. In this unit the light source is directly opposite the photoelectric cell. The photoelectric cell's output is directly proportional to the amount of light received indicating the smoke transmission to the photocell.

The UL-910 Steiner tunnel basically is a steel duct-shaped enclosure 28.5 ft. long, lined with fire brick on the floor and walls to provide a cross-section 17.5 inches $\pm \frac{1}{2}$ inch wide and 12 inches $\pm \frac{1}{2}$ inch high. The side wall contains a series of viewing windows. There is a 25-foot steel lid which is lined with 2-inch thick calcium silicate insulation over $\frac{1}{4}$-inch asbestos-cement board. The tunnel is rendered airtight with a water seal. Methane gas is introduced through two one-inch pipe burners spaced 8 inches apart along a line normal to the airflow pattern. The pipes are 4.5 inches above the floor of the tunnel and 24 feet from the end of the tunnel. These burners provide the diffusion flames to expose the first 4.5 feet of the tested specimen to direct flame at a level of 300,000 BTU/hour.

The air is admitted at the floor level of the tunnel through a 17.5 inch long slit with an adjustable height located 4.5 feet ahead of the burner. Air moves through the tunnel at 240 feet/minute and exhausts the by-products of combustion while providing the air necessary to support the 20 minute burn duration of the test. The other end of the tunnel terminates in a circular exhaust duct 16 inches in diameter. Just beyond the tunnel, the duct takes an upward turn and then a horizontal bend in order to run horizontal at right angles to the tunnel and 4 feet above it. The duct terminates in a 2-foot diameter stack with a fan at its base to provide the suction to pull air through the tunnel. The negative pressure at a tap located in the duct approximately 22 feet from the end of the tunnel is held constant by an automatic damper. There is a vertical path smoke meter located ahead of the damper and a thermocouple one inch below the specimen at the 23rd foot from the burner. A buried thermocouple at 14 feet is used to measure starting temperature for each test.

Air velocity can be regulated by changing negative pressure at dampers since flame-over depends on the turbulence in the tunnel which is carefully monitored by a process controller. The process controller also measures optical density at two separate readings. They measure smoke by means of a photocell and light source mounted in the 16 inch diameter exhaust duct. The optical density Dx of the medium is expressed as follows:

$$Dx = \log_{10}(Io/Ix),$$

wherein Io is the incident light intensity, and Ix is the transmitted light intensity after passing a distance of x through the medium. Therefore, the lower the density Dx, the less smoke which is generated by the test material. The reading is graphed on a continuous basis and from that a peak for the burned specimen and an average are determined. The second value used as a criteria for obtaining listing is flame spread (or the amount of specimen burned past 4.5 feet of area of direct flame).

The following examples are illustrative of the preparation and testing of the fluoropolymer and fluoropolymer-zinc borate compositions of the present application.

EXAMPLE 1

A typical polymerization run in a 30-gallon autoclave is as follows:

17.5 gallons of deionized water are charged into the autoclave and evacuated to remove dissolved oxygen. 32 lbs. of methanol and 170 cc of chloroform are added followed by 75 lbs. of chlorotrifluoroethylene. The contents of the reactor are then chilled to 10° C. The reactor pressure is raised to 175 psig by feeding ethylene and vinylidene flouride in such a way that the mole ratio of vinylidene fluoride and ethylene are controlled through an electronic ratio controller initially in the proportion of 2 to 1. Addition of trichloroacetyl peroxide initiator (as an approximately 5% solution in Genetron-113, a 1,1,2-trifluoro-1,2,2,-trichloroethane compound) is started first by injecting 4.5 gm/hr and then at a rate of 2.5 gm/hr. Vinylidene fluoride and ethylene are continuously fed through the electronic ratio controller to keep the mole ratio at 0.9/1 while keeping the total reactor pressure constant at 175 psig. After around 8 lbs. of vinylidene fluoride is consumed, the reaction is stopped by turning off the vinylidene fluoride and ethylene feed. 150 c.c of 50% sodium hydroxide solution is pumped into the reactor to hydrolyze the residual peroxide and the temperature is raised to room temperature. The reactor is then purged with nitrogen for several hours to bring the chlorotrifluoroethylene concentrate in the reactor vapor phase to less than 25 ppm. The reactor is then opened and the polymer discharged as granular beads in water slurry. The slurry is then dewatered in a centrifuge and dried at 60° C. in an air circulating oven. A total of 45 lbs. of dry polymer is obtained. The dry powder is stabilized by blending in a blender with 0.3% Mark 158 and 0.15% distearyl thiodipropionate in Genetron-113 solution. Elemental analysis of this terpolymer product showed 30.46% carbon, 2.14% hydrogen and 23.24% chlorine, corresponding to a terpolymer composition of 53 mole percent chlorotrifluoroethylene, 36 mole percent ethylene and 11 mole percent vinylidene fluoride. This terpolymer product had a DSC melting point of 170° C.

EXAMPLE 2

Experiment 1 was repeated using an initial vinylidene fluoride/ethylene mole ratio equivalent to 2.2 to 1 and during the run 2.3 to 1. The chain transfer agent used during this run was 250 cc of chloroform. Elemental analysis of the terpolymer product thus obtained showed 28.11% carbon, 1.52% hydrogen and 21.95% chlorine, corresponding to a terpolymer composition of 53 mole percent chlorotrifluoroethylene, 17 mole percent ethylene and 30 mole percent vinylidene fluoride. This terpolymer product had a melting point of 131° C.

EXAMPLE 3

Experiment 1 was repeated with the exception that amount of chain transfer agent, i.e. chloroform, used was 350 cc and initially and during the run vinylidene fluoride/ethylene mole ratio was 1.5/1 and 1.1/1, respectively. Elemental analysis of the above terpolymer product showed 29.81% carbon, 1.98% hydrogen and 24.08% chlorine, corresponding to 55 mole % chlorotrifluoroethylene, 34 mole % ethylene and 11 mole % vinylidene fluoride. This terpolymer product had a melting point of 190° C.

EXAMPLE 4

In another example, the total reactor pressure was 250 psig and initially as well as during the run vinylidene fluoride/ethylene mole ratio was 1.1/1. Based on the elemental analysis, the composition of this product was 48% chlorotrifluoroethylene, 42% ethylene and 10% vinylidene flouride on the mole basis. The DSC melting point determined by Differential Scanning Calorimetry of this terpolymer product was found to be 218° C.

EXAMPLE 5

Yet in another example, the total reactor pressure was 300 psig and the rest of the variables are same as those in Example 4. Elemental analysis of this terpolymer product showed 32.49% carbon, 2.51% hydrogen and 22.58% chlorine, corresponding to 48 mole percent chlorotrifluoroethylene, 40 mole percent ethylene and 12 mole percent vinylidene fluoride. The DSC melting point of this product was 220° C.

EXAMPLE 6

Yet in another experiment the total reactor pressure was kept at 225 psig. Initial vinylidene fluoride to ethylene mole ratio was 1.4/1 and during the run it was kept at 1.75/1. Other conditions were same as those in the previous example. Elemental analysis of this terpolymer product showed 31.07% carbon, 2.36% hydrogen, 23.66% chlorine, corresponding to a mole ratio of chlorotrifluoroethylene/ethylene and vinylidene fluoride equivalent to 50/42/8. The DSC melting point of this product was 210° C.

EXAMPLE 7

Two 3"×4"×1/16" plaques were made using the terpolymer obtained in Example 1. A 6"×6" iron wire gauge was sandwiched between the terpolymer plaques. 24"×1" strips were made using the above sandwiched plaque. These strips were used as the specimens for determining the flame and smoke characteristics in Monsanto's two foot tunnel.

EXAMPLE 8

In another example the terpolymer obtained in Example 1 was melt blended with 3% zinc borate (Firebrake ZB TM from U.S. Borax) and then the specimens were made as described in Example 7.

EXAMPLES 9 thru 15

In these examples, terpolymer samples obtained from Examples 2 through 6 were melt blended with 3% by weight zinc borate and then the specimens were made as described in Example 7.

All the samples for examples 9 through 15 were then tested for flame spread, peak smoke and average smoke.

Flame spread is the length of specimen burned by the direct flame during approximately one-half of the time of an arbitrarily selected time interval. Total smoke is defined as the amount of smoke generated over the entire duration of the test. In these examples a comparative value of 100 units for a HALAR$^R$ control sample is used. Peak smoke is defined as the maximum smoke generated at any time during the test. In these examples, a comparative value of 10 units for a HALAR$^R$ control sample is used.

The results are tabulated in the table below.

| Example | Sample From Example No. | Flame Spread Inches | Peak Smoke | Total Smoke |
|---|---|---|---|---|
| 9 | 1 | 11 | 7 | 130 |
| 10 | 2 | 12 | 11.2 | 148 |
| 11 | 3 | 11 | 6.4 | 116 |
| 12 | 4 | 10 | 3 | 38 |
| 13 | 5 | 10 | 3 | 23 |
| 14 | 6 | 10 | 3 | 40 |
| 15 | HALAR$^R$ Control | 11 | 10 | 100 |

EXAMPLE 16

Yet in another example, a terpolymer synthesized in accordance with this invention containing 54.6 mole % chlorotrifluoroethylene, 34.6 mole % ethylene, and 10.8 mole % vinylidene fluoride, was melt blended with 3% by weight of zinc borate (Firebrake ZB) and made into a 35 mil jacket over a 25 pair HALAR$^R$ primary. This jacketed cable was then tested in a UL 910 Steiner tunnel test. The basic criteria for acceptance are maximum peak smoke 0.15, maximum average smoke 0.5, and maximum flame spread 5 feet.

The composition synthesized had a peak smoke of 0.28 and 0.33 (two different runs) and average smoke of 0.12 and flame spread was 4 feet.

The complete property profile for this material is as follows:

| | |
|---|---|
| DSC melting point | 190° C. |
| Glass Transition Temperature | 65° C. vs 80° C. for HALAR$^R$ control |
| MI at 250° C. | 5.5 |
| Tensile strength | 3850 psi |

| | | |
|---|---|---|
| Tensile modulus | 75,000 psi | |
| Flexural modulus | 84,000 psi | |
| Ultimate elongation | 350% | |

Melt viscosities for the terpolymer at 230° C. ranged from about 100,000 centipoises at a shear rate of about 1,000 sec$^{-1}$ to about 400,000 centipoises at a shear rate of about 100 sec$^{-1}$. Melt viscosities for the HALAR$^R$ control at 275° C. ranged from about 500,000 centipoises at a shear rate of about 1,000 sec$^{-1}$ to about 900,000 centipoises at a shear rate of about 300 sec$^{-1}$.

| Electrical Properties | | |
|---|---|---|
| Dielectric constant at | 50 Hz | 2.85 |
| | 10$^3$ Hz | 2.82 |
| | 10$^6$ Hz | 2.61 |
| Dissipation factor at | 50 Hz | 0.02 |
| | 10$^3$ Hz | 0.014 |
| | 10$^6$ Hz | 0.04 |
| Dielectric strength | 410 v/mil | |

Stress crack resistance and cold bend test - passed
Mandrel wrap test at 150° C. per ASTM D-2951 - passed
UL-910 Steiner tunnel test - passed

EXAMPLE 17

Two 3"×4"×1/16" plaques were made using a chlorotrifluoroethylene/ethylene copolymer*. A 6"×6" iron wire gauge was sandwiched between the chlorotrifluoroethylene/ethylene copolymer* plaques. 24"×1" strips were made using the above sandwiched plaque. These strips were used as the specimens for determining the flame and smoke characteristics in the Monsanto two foot tunnel (see attached description of this test). The results for peak smoke and total smoke are as follows:
*HALAR$^R$.

| Peak Smoke | Total Smoke |
|---|---|
| 10 | 100 |

EXAMPLE 18

In another experiment a chlorotrifluoroethylene/ethylene copolymer* was melt blended with 1% zinc borate (Firebrake ZB ™ from U.S. Borax) and then the specimens were made as described in Example 1 and tested in the 2 foot tunnel for smoke density when burnt. The results were:
*HALAR$^R$.

| Peak Smoke | Total Smoke |
|---|---|
| 5 | 35 |

EXAMPLE 19

Yet in another experiment a chlorotrifluoroethylene/ethylene copolymer* was melt blended with 0.5% zinc borate (Firebrake ZB from U.S. Borax) and then the specimens were made as described in Example 1 and tested as above and the results were:
*HALAR$^R$

| Peak Smoke | Total Smoke |
|---|---|
| 2 | 2 |

EXAMPLE 20

A plenum telephone cable was made using 25-pair 0.005" wall primary insulation of chlorotrifluoroethylene/ethylene copolymer with a 0.032" wall jacket fabricated from chlorotrifluoroethylene/ethylene copolymer containing 1% zinc borate (Fire brake ZB). This cable was tested for flame spread and smoke generation in the Steiner tunnel per UL$^R$910 protocol (see description of this test). The peak smoke and average smoke generated in duplicate tests are shown:

| Test No. | Peak Smoke (Optical Density) | Average Smoke (Optical Density) |
|---|---|---|
| 1 | 0.29 | 0.09 |
| 2 | 0.17 | 0.07 |

For comparison, a plenum telephone cable made by using 25-pair 0.005" wall primary insulation of chlorotrifluoroethylene/ethylene copolymer" with a 0.032" wall jacket fabricated from chlorotrifluoroethylene/ethylene copolymer* containing no zinc borate additive was also tested in the Steiner tunnel per UL$^R$910 protocol. The test results are as shown:
*HALAR$^R$

| Test No. | Peak Smoke (Optical Density) | Average Smoke (Optical Density) |
|---|---|---|
| 1 | 0.4174 | 0.135 |
| 2 | 0.4495 | 0.1236 |
| 3 | 0.3310 | 0.1234 |

EXAMPLE 21

2,270 grams of ethylene/tetrafluoroethylene/hexafluoroisobutylene powder (HALON$^R$ ET-102) was blended with 45.4 grams of anhydrous zinc borate (XPI-187) and mixed for ½ hour in a Hobart mixer. The amount of zinc borate present was about 2 wt. % based on the weight of ethylene/tetrafluoroethylene/hexafluoroisobutylene resin.

This composition, as well as a control ethylene/tetrafluoroethylene/hexafluoroisobutylene (HALON$^R$ET-102) sample without zinc borate were extruded in a 1" single screw extruder and pelletized.

Both the control and the zinc borate-containing pellets were molded into 22" long strips and tested in the Monsanto 2-foot tunnel. Peak Smoke, Total Smoke, and Flame Spread were measured. The results, based on normalizing smoke values to 100 for the control sample, were as follows:

| Sample | Peak Smoke | Total Smoke | Flame Spread |
|---|---|---|---|
| Control HALON ET-102 | 100 | 100 | 21 |
| HALON ET-102 plus 2 wt. % zinc borate | 62 | 74 | 16 |

EXAMPLE 22

A communications cable construction was made using a 200 pair primary insulation of a thickness of about 5 mils of chlorotrifluoroethylene/ethylene copolymer (HALAR$^R$) and a jacket of an average thickness of about 30 mils of chlorotrifluoroethylene/ethylene copolymer (HALAR$^R$) containing 2% anhydrous zinc borate. Sample 1 comprised 12 cables which had a polyethyelene terephthalate core tape, and Sample 2 comprised 13 cables with a tetrafluoroethylene Teflon fiberglass core tape. Two tests were conducted on each sample. Flame spread, peak smoke, and average smoke were as follows:

| Test No. | Maximum Flame Spread (feet) | Optical Density | |
|---|---|---|---|
| | | Peak Smoke | Average Smoke |
| Sample 1 | | | |
| 1 | 2.5 | 0.22 | 0.07 |
| 2 | 2.0 | 0.21 | 0.07 |
| Sample 2 | | | |
| 1 | 2.0 | 0.17 | 0.06 |
| 2 | 2.0 | 0.22 | 0.06 |

For comparison, a communications cable construction of a 200 pair primary insulation of a thickness of about 6 mils of chlorotrifluoroethylene/ethylene copolymer (HALAR$^R$) and a chlorotrifluoroethyelene/ethylene copolymer (HALAR$^R$) jacket, having a thickness of about 35 mils, both insulation and jacket being without zinc borate additive, was tested for flame spread, peak smoke, and average smoke. Sample 1 was comprised of 12 cables and had a polyethylene terephthalate core tape, whereas Sample 2 was comprised of 12 cables and had a tetrafluoroethylene Teflon fiberglass core tape. Two tests were conducted on each sample. The results were as follows:

| Test No. | Maximum Flame Spread (feet) | Optical Density | |
|---|---|---|---|
| | | Peak Smoke | Average Smoke |
| Sample 1 | | | |
| 1 | 1.5 | 0.42 | 0.12 |
| 2 | 1.5 | 0.30 | 0.12 |
| Sample 2 | | | |
| 1 | 2.5 | 0.38 | 0.09 |
| 2 | 2.5 | 0.38 | 0.10 |

EXAMPLE 23

A communications cable construction employing a 200 pair primary insulation material of a thickness of about 7 mils of chlorotrifluoroethylene/ethylene copolymer (HALAR$^R$) and 2% anhydrous zinc borate, and a jacketing material of a thickness of about 27 mils of a chlorotrifluoroethylene/ethylene copolymer and 2% anhydrous zinc borate. (HALAR$^R$). The sample was comprised of 12 cables and used a tetrafluoroethylene Teflon fiberglass core tape. Flame spread, peak smoke, and average smoke were measured. The results were as follows:

| Test No. | Maximum Flame Spread (feet) | Optical Density | |
|---|---|---|---|
| | | Peak Smoke | Average Smoke |
| 1 | 1.5 | 0.24 | 0.07 |
| 2 | 1.5 | 0.22 | 0.06 |

It is to be understood that the fluoropolymer and zinc borate compositions of this invention are not limited to the specific examples described above. The invention can be made or practiced other than as specifically described and still be within the scope of the accompanying claims.

What is claimed is:

1. A composition for insulating or jacketing wires or cables comprising from about 90 wt. % to about 99.8 wt. % of a fluorinated polymer and from about 0.2 wt. % to about 10 wt. % of zinc borate[ZnCO$_3$].

2. The composition of claim 1 wherein said fluorinated polymer is selected from the class consisting of chlorotrifluoroethylene/ethylene/vinylidene fluoride terpolymer, chlorotrifluoroethylene/ethylene copolymer, and ethylene/tetrafluoroethylene/hexafluoroisobutylene terpolymer, and said additive compound is zinc borate.

3. The composition of claim 2 wherein said fluoride polymer is a chlorotrifluoroethylene/ethylene/vinylidene fluoride terpolymer.

4. The composition of claim 3 wherein said zinc borate is present in an amount of about 1 wt. % to about 10 wt. %.

5. The composition of claim 4 wherein said zinc borate is present in an amount of about 2 wt. % to about 4 wt. %.

6. The composition of claim 5 wherein said zinc borate is present in an amount of about 3 wt. %.

7. The composition of claim 3 wherein chlorotrifluoroethylene is present from about 45 mole % to about 55 mole % of the terpolymer.

8. The composition of claim 3 wherein said ethylene is present from about 15 mole % to about 45 mole % of the terpolymer.

9. The composition of claim 3 wherein said vinylidene fluoride is present from about 8 mole % to about 30 mole % of the terpolymer.

10. The composition of claim 2 wherein said fluoropolymer is a chlorotrifluoroethylene/ethylene copolymer.

11. The composition of claim 10 wherein said zinc borate is present in amounts from about 0.2 wt. % to about 5 wt. %.

12. The composition of claim 11 wherein said zinc borate is present in amounts from about 0.5 wt. % to about 2.0 wt. % of the weight.

13. The composition of claim 10 wherein said chlorotrifluoroethylene/ethylene copolymer has a molecular weight from about 50,000 to about 1,000,000.

14. The composition of claim 13 wherein said chlorotrifluoroethylene/ethylene copolymer has a molecular weight from about 60,000 to about 600,000.

15. The composition of claim 10 wherein the chlorotrifluoroethylene is present from about 40 mole % to about 60 mole % of the copolymer, and the ethylene is present from about 40-mole % to about 60 mole % of the copolymer.

16. The composition of claim 15 wherein the chlorotrifluoroethylene is present from about 48 mole % to about 52 mole % of the copolymer, and the ethylene is present from about 48 mole % to about 52 mole % of the copolymer.

17. The composition of claim 16 wherein the chlorotrifluoroethylene is present at about 50 mole % of the copolymer and the ethylene is present at about 50 mole % of the copolymer.

18. The composition of claim 2 wherein said fluoropolymer is an ethylene/tetrafluoroethylene/hexafluoroisobutylene terpolymer.

19. The composition of claim 18 wherein said zinc borate is present in an amount of about 2 wt. %.

20. The composition of claim 18 wherein said ethylene is present from about 35 mole % to about 45 mole % of said ethylene/tetrafluoroethylene/hexafluoroisobutylene terpolymer and said tetrafluoroethylene is present from about 40 mole % to about 60 mole % of said ethylene/tetrafluoroethylene/hexafluoroisobutylene terpolymer, and said hexafluoroisobutylene is present in an amount from about 5 mole % to about 15 mole % of said ethylene/tetrafluoroethylene/hexafluoroisobutylene terpolymer.

21. The composition of claim 20 wherein said ethylene is present at about 45 mole % of said ethylene/tetrafluoroethylene/hexafluoroisobutylene terpolymer, said tetrafluoroethylene is present at about 50 mole % of said ethylene/tetrafluoroethylene/hexafluoroisobutylene terpolymer, and said hexafluoroisobutylene is present at about 5 mole % of said ethylene/tetrafluoroethylene/hexafluoroisobutylene terpolymer.

22. The composition of claim 18 wherein said ethylene/tetrafluoroethylene/hexafluoroisobutylene terpolymer has a molecular weight from about 100,000 to about 1,000,000.

23. The composition of claim 22 wherein said ethylene/tetrafluoroethylene/hexafluoroisobutylene terpolymer has a molecular weight from about 300,000 to about 800,000.

24. A low-flame, low-smoke, insulating or jacketing material extruded from the composition of claim 1.

* * * * *